United States Patent [19]

Maenishi

[11] Patent Number: 6,072,385

[45] Date of Patent: Jun. 6, 2000

[54] MESSAGE SENDING SYSTEM

[75] Inventor: Yasuhiro Maenishi, Kofu, Japan

[73] Assignee: Matsushita Electric Industrial Co., Ltd., Japan

[21] Appl. No.: 09/034,355

[22] Filed: Mar. 4, 1998

Related U.S. Application Data

[63] Continuation of application No. 08/749,219, Nov. 14, 1996, Pat. No. 5,831,517.

[30] Foreign Application Priority Data

Nov. 17, 1995 [JP] Japan .................................. 7-299422

[51] Int. Cl.⁷ ..................................................... H04Q 1/30
[52] U.S. Cl. ................................. 340/311.1; 340/825.44
[58] Field of Search ............................. 340/311.1, 825.44

[56] References Cited

U.S. PATENT DOCUMENTS

| | | | |
|---|---|---|---|
| 4,766,434 | 8/1988 | Matai et al. ............................. | 340/825 |
| 5,146,216 | 9/1992 | DeLuca et al. .......................... | 340/825 |
| 5,173,688 | 12/1992 | DeLuca et al. .......................... | 340/825 |
| 5,363,090 | 11/1994 | Cannon et al. .......................... | 340/825 |
| 5,426,424 | 6/1995 | Vanden Heuvel et al. .............. | 340/825 |
| 5,430,436 | 7/1995 | Fennell .................................... | 340/825 |
| 5,831,517 | 11/1998 | Maenishi ............................... | 340/311.1 |
| 5,902,234 | 5/1999 | Webb ...................................... | 600/300 |

*Primary Examiner*—Edward Lefkowitz
*Attorney, Agent, or Firm*—Parkhurst & Wendel, L.L.P.

[57] ABSTRACT

The invention relates to a system for sending a message to a terminal possessed by an operator if various events occur in a mounting machine for mounting parts on a circuit substrate or the like, and more specifically when occurrence of an event in a facility is detected by a detector of a calling device, a preliminarily registered message is determined according to the present event, and the determined message is divided into outline portion and detail portion, and the divided message is sent from the transmitter. At the receiving terminal, this message is received, and it is noticed to the operator by buzzing or vibrating, and the outline message is displayed. When a specific key is pressed, the detail message is displayed.

5 Claims, 14 Drawing Sheets

FIG.2
(a)
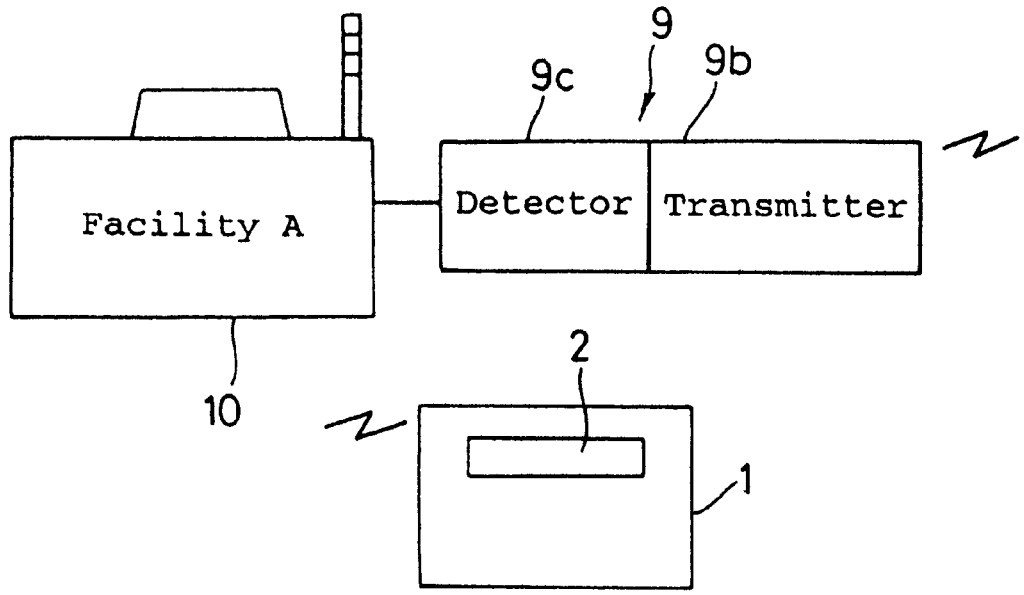
(b)
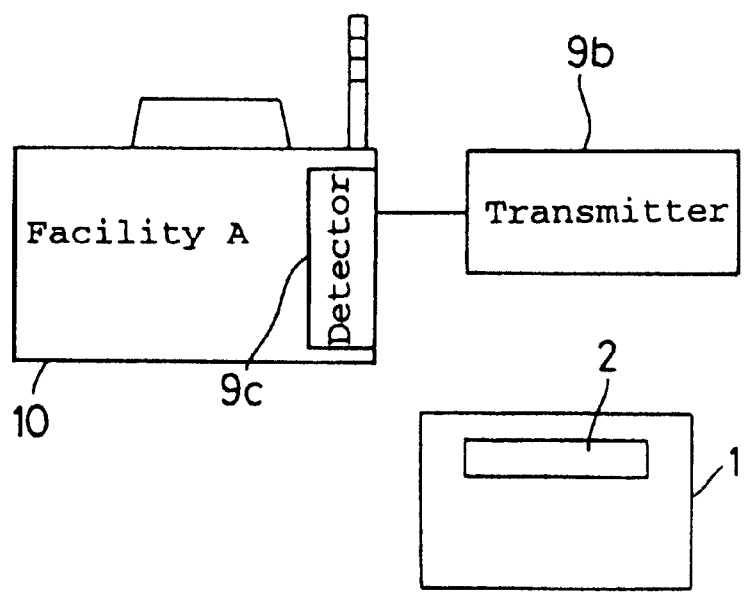

FIG.5
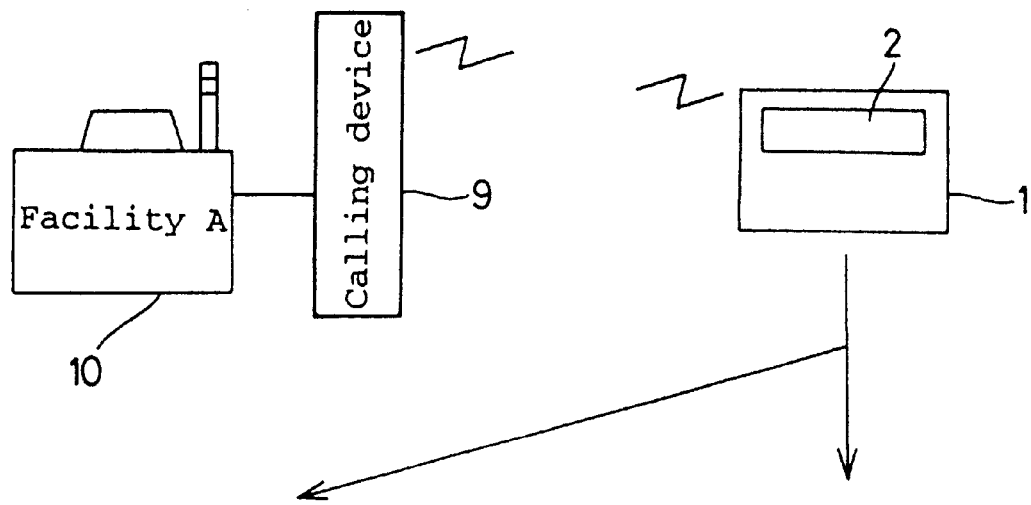
Outline information
Machine A Z150
Occurrence of parts shortage
(Line name: Line 15)
Detail information
Occurrence of parts shortage
Line 15, machine A
Part name: 1005CR
Quantity: 5000
Polarized parts [Caution]
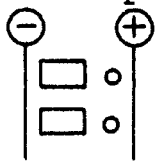

|  |  |  | Logic form |
|---|---|---|---|
| Example 1. | When receiving only event of facility A: | | A |
| Example 2. | When receiving event of facility A, B | | A+B |
| Example 3. | When receiving event of facility B, C | | Y or B+C |
| Example 4. | When receiving events occurring simultaneously in facilities A and B | | A*B |

FIG.10
PRIOR ART
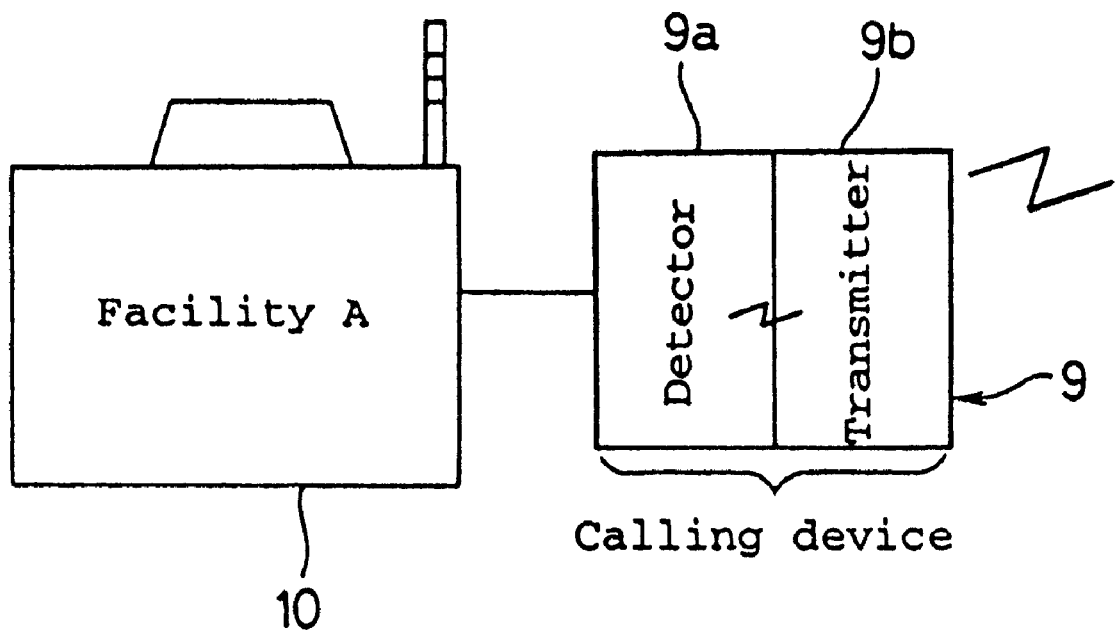
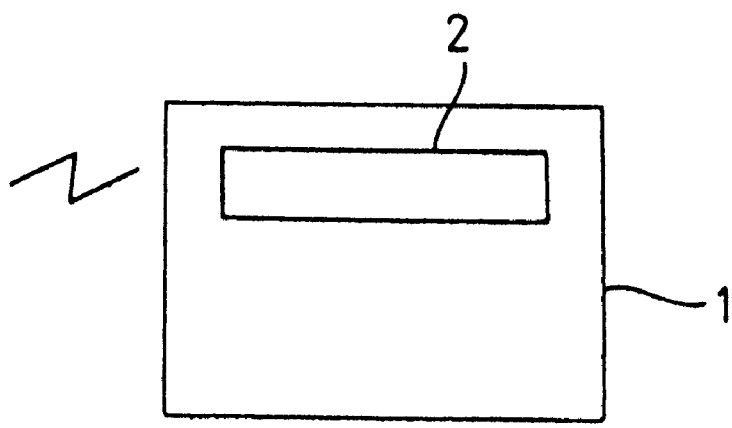

FIG.13
PRIOR ART

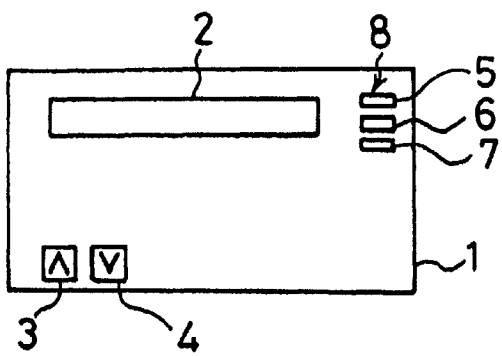

| Detection order | Mode | Pager code | Risk | Emergency | Message |
|---|---|---|---|---|---|
| 4 | Individual | 100 | C | C | Parts shortage occurrence |
| 3 | Batch | — | A | A | Fire occurrence |
| 2 | Group | 1 | A | B | Trouble occurrence |
| 1 | | | | | |

⇓ Transmission sequence is determined dynamically

| Send order | Mode | Pager code | Risk | Emergency | Message |
|---|---|---|---|---|---|
| 4 | Individual | 100 | C | C | Parts shortage occurrence |
| 3 | Group | 1 | A | B | Trouble occurrence |
| 2 | Batch | — | A | A | Fire occurrence |
| 1 | | | | | |

Transmission information

| Mode | Call terminal No. | Risk | Message data |
|---|---|---|---|
| | | | |

FIG.14
PRIOR ART
| Send order | Mode | Pager code | Risk | Emergency | Message |
|---|---|---|---|---|---|
| 3 | Individual | 100 | C | C | Z |
| 2 | Group | 1 | A | B | Y |
| 1 | Batch | — | A | A | X |
○ Message transmission sequence
(1) Transmission by changing transmission order by emergency
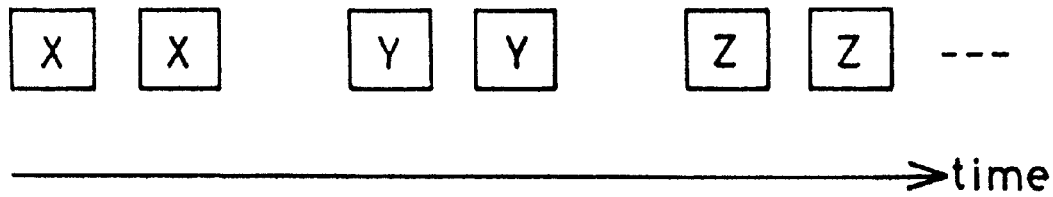
(2) Batch transmission of information within queue
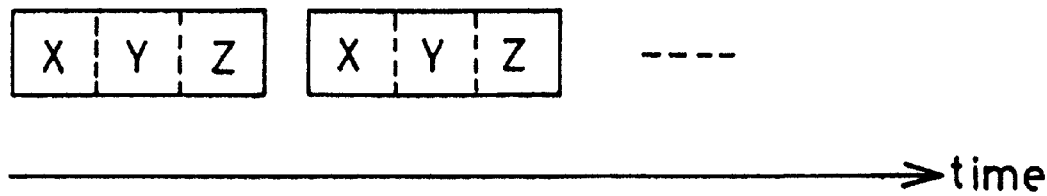

MESSAGE SENDING SYSTEM

This is a Continuation of application Ser. No. 08/749,219 filed Nov. 14, 1996, now U.S. Pat. No. 5,831,517.

FIELD OF THE INVENTION

The present invention relates to a system for sending a message to a terminal possessed by an operator on the occasion of various events occurring in a mounting machine for mounting parts on a circuit board or the like.

BACKGROUND OF THE INVENTION

In a mounting machine for mounting parts on a circuit board, recently, it has been attempted to realize a long-period operation of facility for working continuously for 24 hours or 365 days, and to enhance the operation rate by shortening the shutdown time due to shortage of parts or machine trouble.

The following is proposed as a message sending system.

That is, regarding various events occurring in the mounting machine and facility, not only the information of detected event, but also the information of level of risk of the event or degree of emergency is also taken into consideration, and the transmission sequence from the calling device is varied dynamically as required. It is hence possible to present a system capable of sending the information truly necessary for the operator in the order of degree of necessity. Also by incorporating a system comprising a calling mode, the operator of the group relating to the present event of the facility can be called, or all operators relating to the facility can be called in batch, so that the information of one facility can be transmitted to all responsible operators in real time (without time delay).

The message sending system of the facility such as mounting machine is described below while referring to the drawings.

FIG. 9 is a front view showing a receiving terminal (pager) of such message sending system. As shown in FIG. 9, the receiving terminal 1 comprises a message display area 2 for displaying transmitted information in characters, a message roll-up key 3 and a roll-down key 4 for reviewing the history of the messages received in the past, and a risk rate display area 8 for indicating the risk rate (importance) of the transmitted information in a red display 5, a yellow display 6 or a blue display 7.

FIG. 10 is a diagram showing the system configuration at the message calling side. As shown in FIG. 10, the message calling side system comprises a calling device 9 composed of a detector 9a for detecting information from the mounting machine or facility 10, and a transmitter 9b for sending the information to the receiving terminal 1.

FIG. 11 is a flowchart showing the control operation of the message sending system, explaining the procedure from occurrence of an event in the facility 10 until the receiving terminal 1 receives a message.

That is, at step #1, when occurrence of an event in the facility 10 is detected by the detector 9a of the calling device 9, at step #2, a preliminarily registered message is determined by control means according to the present event, and this message is transmitted from the transmitter 9b (step #3). At the receiving terminal 1, this message is received (step #4), and the buzzer sounds or vibration is caused to notify the operator (step #5), and the message is displayed (step #6).

FIG. 12 is a drawing showing other example of a system at message calling side. As shown in FIG. 12, the system at the message calling side comprises a calling device 9 for transmitting information, and a detecting circuit 13 for detecting information from plural facilities 10, 11, 12, and the detecting circuit 13 incorporates the queue (first-in first-out or FIFO system) for storing information to be transmitted from the plural facilities 10, 11, 12.

As shown in FIG. 13, in this system at the message calling side, the information on the queue storing the information to be transmitted from the plural facilities 10, 11, 12 is dynamically reshuffled in the sequence of emergency A, B, C in the detecting circuit 13. From the calling device 9, the information is transmitted in the sequence of emergency, such as Fire, Trouble, and Parts shortage. The transmission conforms to the mode instruction, and, for example, the message of Fire is simultaneously transmitted to all operators, Trouble is simultaneously transmitted to all operators belonging to group 1, and Parts shortage is transmitted to operator No. 100.

Explaining this operation schematically, information such as machine trouble occurring in the facilities 10, 11, 12 is detected by the detecting circuit 13, and stored in the queue in the sequence of occurrence of information. Then the queue information is reshuffled dynamically according to the emergency A, B, C, and the information is transmitted to all operators preset in each facility.

FIG. 14 is a diagram for explaining the transmission information to the receiving terminal 1. Its method is roughly classified into (1) and (2). In method (1), the message data in FIG. 12 is transmitted in the sequence according to the degree of emergency. In method (2), the information on the queue accumulating the transmitted information is dynamically reshuffled according to emergency A, B, C, and accumulated pieces of information on the queue are processed into one set of information and is transmitted at once from the calling device 9.

In this constitution, however, the following problems are present.

First, according to the constitution, all operation corresponding to the preset information is transmitted from the calling device 9, and all transmitted information is displayed in the receiving terminal 1 of the operator, and therefore, for example, as information is transmitted to the receiving terminal 1 of the operator successively, if next information is transmitted before the operator recognizes and confirms all the information transmitted up to the moment, the message display area 2 is updated to be replaced by the latest information, and the preceding information may be concealed in the back region.

Second, although there is a concept of calling mode in the calling device 9, destination of information to which receiving terminal 1 is designated at the calling device 9 side, and the receiving information cannot be selected at the operator side, and if the operator attempts to change the desired information, it is forced to change the setting in the calling device 9.

Third, the receiving terminal 1 displays only characters and the expression is not visual, and it may be hard to understand the event intuitively or the event may not be specifically expressed.

DISCLOSURE OF THE INVENTION

To solve the above problems, it is hence an object of the invention to present a message sending system allowing the operator to select the information depending on the circumstances at the receiving terminal possessed by the operator, and also allowing the operator to understand the content of the event intuitively.

To solve the problems, the message sending system of the invention comprises a detector for detecting an event occurring in a facility such as mounting machine and issuing as information, a transmitter for transmitting the information, and a receiving terminal possessed by an operator of the facility for receiving and displaying the information from the transmitter, wherein the facility, detector, and transmitter are provided in a plurality respectively, and the receiving terminal is furnished with selecting means for selecting the facility, transmitter, or receiving information content.

Accordingly, the operator can determine whether or not to confirm all messages (outline message and detail message) depending on the circumstances, and if only the outline message is confirmed, the operator can confirm the detail message later in a free time.

The invention also provides a message sending system comprising a detector for detecting an event occurring in a facility such as mounting machine and issuing as information, a transmitter for transmitting the information by wireless means or the like, and a receiving terminal possessed by an operator for receiving and displaying the information from the transmitter, wherein the facility, detector, and transmitter are provided in a plurality respectively, and the receiving terminal is furnished with selecting means for selecting the facility, transmitter, or receiving information content, and the selecting means has, for example, a function for setting which information to receive out of a plurality of transmitters or plural information transmitted from single transmitter, in a logic form of ID number such as terminal number of transmitter and mounting machine number of the facility.

Accordingly, the operator at the receiving terminal side can select and obtain information from the transmitters, facilities, or receiving information contents.

In addition to the above constitution, the invention is also characterized by the receiving terminal which is notified by sound or vibration when receiving information from the transmitter, and displays not only characters but also pictures depending on the received information.

As a result, the operator is notified by optimum compound means depending on the situation of event occurring in the mounting machine or environments, so that the operator at the receiving terminal side can intuitively understand the situation of the event occurring in the mounting machine or facility by pictures, and therefore the message can be transmitted most efficiently and effectively for the operator.

BRIEF DESCRIPTION OF THE DRAWINGS

FIGS. 2(*a*) and (*b*) are system configuration diagrams of the same message sending system;

FIG. 5 is a diagram showing a message transmission example at the time of occurrence of parts shortage of the same message sending system;

FIG. 10 is a diagram showing a system configuration of the same conventional message sending system;

FIG. 13 is a diagram for explaining transmission information of the same conventional message sending system; and FIG. 14 is a diagram for explaining message transmission sequence of the same conventional message sending system.

DESCRIPTION OF THE EMBODIMENTS

Figure 1:
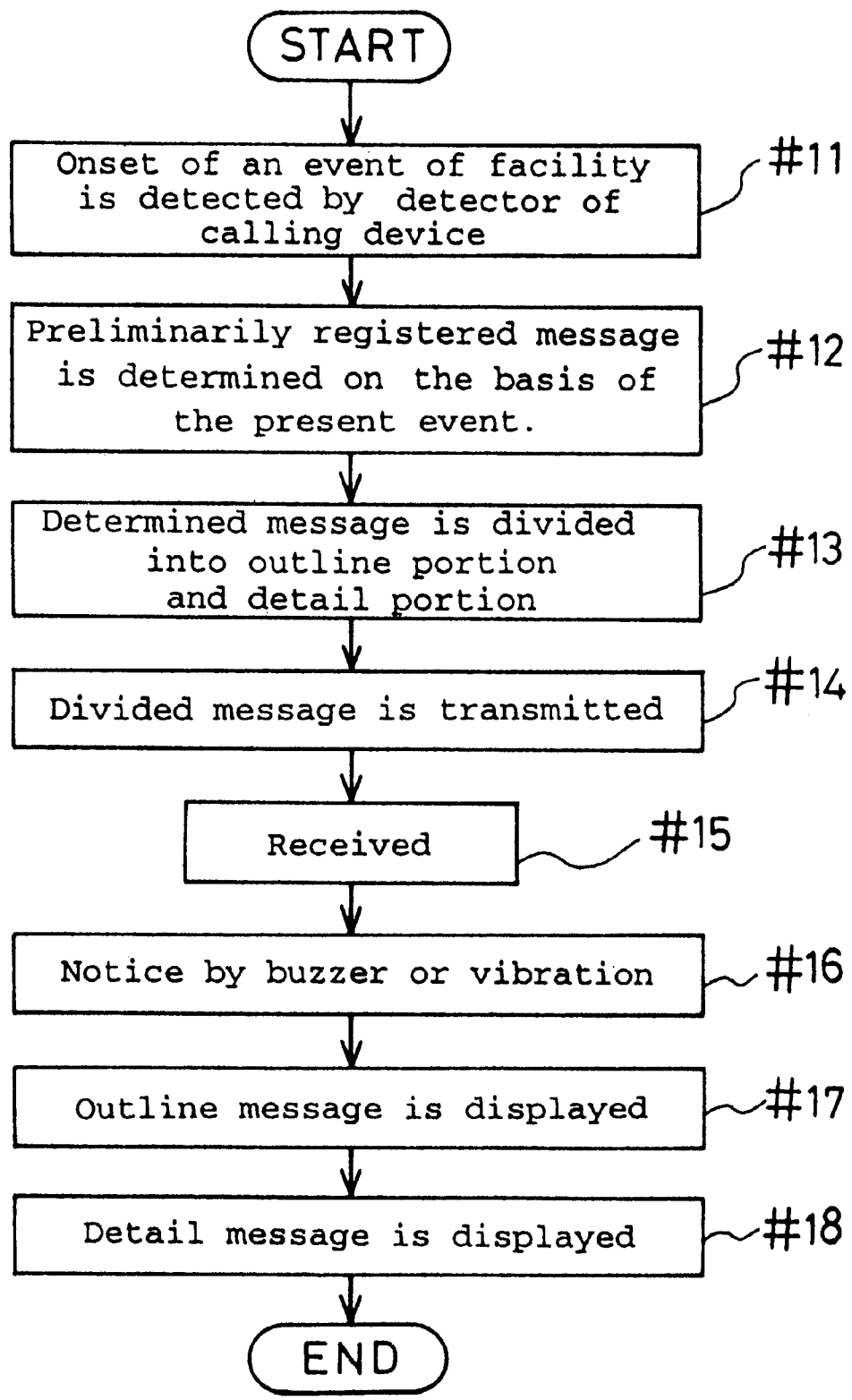
FIG. 1 is a flowchart of control operation of a message sending system according to an embodiment of the invention.

Referring now to the drawings, a message sending system in a mounting machine according to an embodiment of the invention is described below. Similar functions as in the prior art are identified with same reference numerals.

FIG. 2 shows the system configuration at the message calling side in the message sending system. In the system of the message calling side shown in FIG. 2(*a*), the calling device 9 comprises a detector 9*c* for detecting an event occurring in a facility 10 such as mounting machine, and classifying the detected information into outline message information and detail message information, and a transmitter 9*b* for issuing outline and detail information containing the outline message information and detail message information by radio means. Or, as shown in FIG. 2(*b*), the detector 9*c* may be provided in the facility 10.

Figure 3:
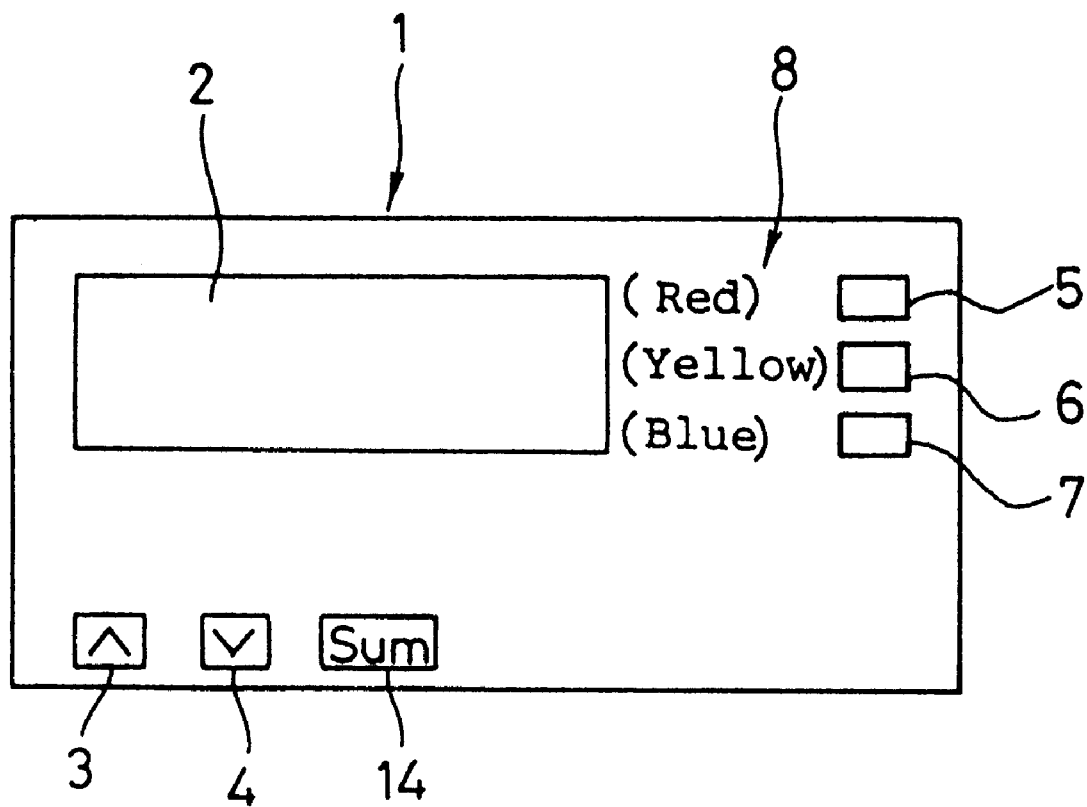
FIG. 3 is a front view of a receiving terminal of the same message sending system.

FIG. 3 is a diagram showing a receiving terminal in the message sending system. As shown in FIG. 3, the receiving terminal 1 is composed of a message display area 2 for displaying the transmitted information in characters, a message roll-up key 3 and a roll-down key 4 for reviewing the history of the messages received in the past, a risk rate display area 8 for indicating the risk rate of the transmitted information (importance; in a red display 5, a yellow display 6 or a blue display 7), and a key 14 as display changeover means for changing over the transmitted information between the outline portion and detail portion. Or, the risk rate display area 8 may be omitted.

FIG. 1 is a flow chart showing the control operation of this message sending system, explaining the procedure from onset of an event in the facility 10 until a message is received by the receiving terminal 1.

At step #11, when an onset of event in the facility 10 is detected by the detector 9*a* of the calling device 9, at step #12, a preliminarily registered message is determined according to the present event, and the determined message is divided into the outline portion and detail portion (step #13), and the divided message is sent from the transmitter 9*b* (step #14). In the receiving terminal 1, this message is received (step #15), and it is noticed to the operator by buzzer or vibration (step #16), and the outline message is displayed (step #17). When the key 14 is pressed, the detail message is displayed (step #18).

Referring to FIG. 4 through FIG. 7, an example of transmitting and displaying the information of the event occurring in the facility 10 by dividing into outline and detail is described below.

Figure 4:
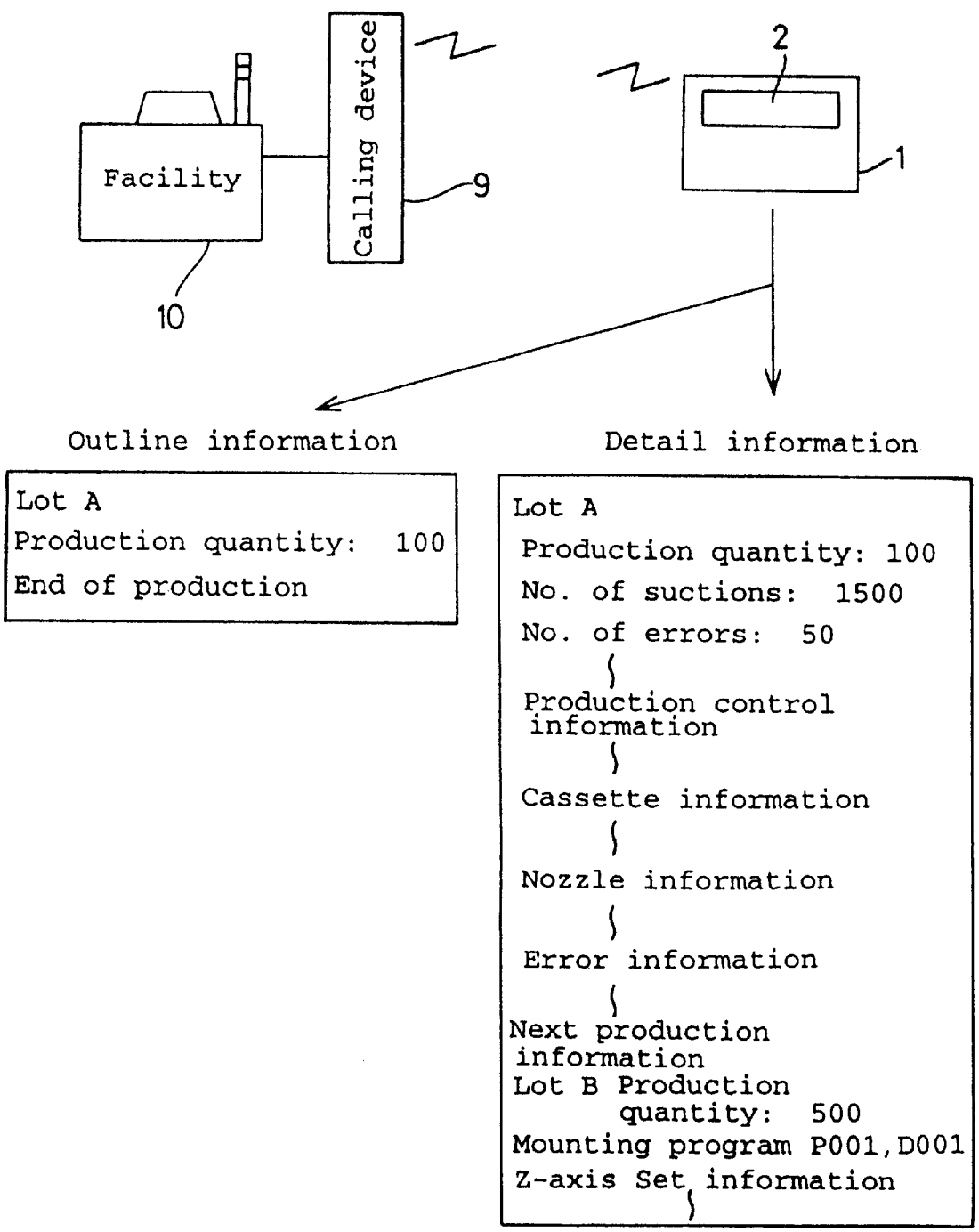
FIG. 4 is a diagram showing a message transmission example at the end of lot production of the same message sending system.

FIG. 4 is a message transmission example at the end of lot production in the message sending system of the invention. As shown in FIG. 4, to the receiving terminal 1 designated at the ending moment of the present production lot in the facility 10, outline information (lot name, production quantity, and other outline information about the lot) and detail information (lot name, production quantity, total number of parts mounted, number of errors, production time, production control information, cassette information, nozzle information, quantity information, other detail information of present production lot, and detail information of next production lot such as lot name of next production lot, planned production quantity, mounting program name, preparation of parts, and mounting instruction information) are transmitted. To the operator, when the present production lot is finished, the outline information and detail information are transmitted to the receiving terminal 1 through the calling device 9 from the facility 10. In the receiving terminal 1, together with vibration or buzzer sound, the characters of the outline information shown in FIG. 4 are expressed in the message display area 2. By subsequent manipulation of the key 14 by the operator, the outline information and detail information are changed over and displayed.

FIG. 5 shows an example of message transmission at the time of occurrence of parts shortage by the message sending system of the invention. As shown in FIG. 5, the moment a parts shortage occurs in the facility 10, outline information (line name, facility name, parts setting position information, and other outline information) and detail information (line name, facility name, parts setting position information, part name, number of parts, parts polarity information, and other detail information) are transmitted to the designated receiving terminal. The operator is informed when the parts shortage occurs as the outline information and detail information are transmitted from the facility 10 to the receiving terminal 1 through the calling device 9. At the receiving terminal 1, first, together with vibration or buzzer sound, characters of outline information shown in FIG. 5 are expressed. Later, by the manipulation of the operator, the outline information and detail information are changed over by the key 14 and displayed. As for the detail information in FIG. 5, it is a feature that a picture is displayed together with the characters, telling which part should be set in which direction, in the message display area 2, and it is expected to eliminate setting errors of polarized parts in the facility.

Figure 6:
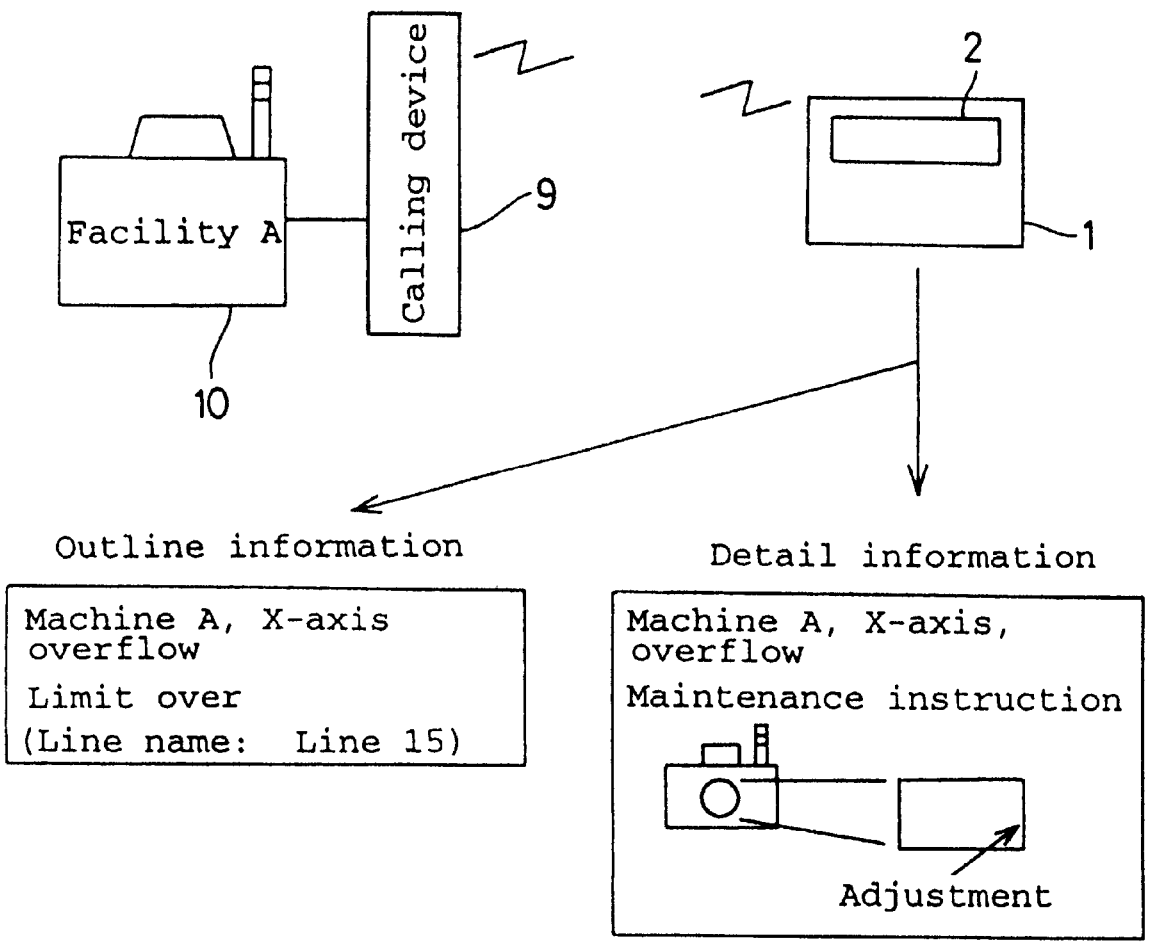
FIG. 6 is a diagram showing message transmission example 1 upon onset of an error of the same message sending system.

FIG. 6 is a diagram showing message transmission example 1 upon onset of an error of the message sending system of the invention. As shown in FIG. 6, when an error occurs in the facility 10, outline information (line name, facility name, error name, error number, and other outline information) and detail information (line name, facility name, error name, error number, maintenance instruction, and other detail information) are transmitted to the designated receiving terminal. The operator is informed when the error occurs as the outline information and detail information are transmitted from the facility 10 to the receiving terminal 1 through the calling device 9. At the receiving terminal 1, first, together with vibration or buzzer sound, characters of outline information shown in FIG. 5 are expressed. Later, by the manipulation of the operator, the outline information and detail information are changed over by the key 14 and displayed. As for the detail information in FIG. 6, it is a feature that a picture is displayed to instruct maintenance in the message display area 2.

Figure 7:
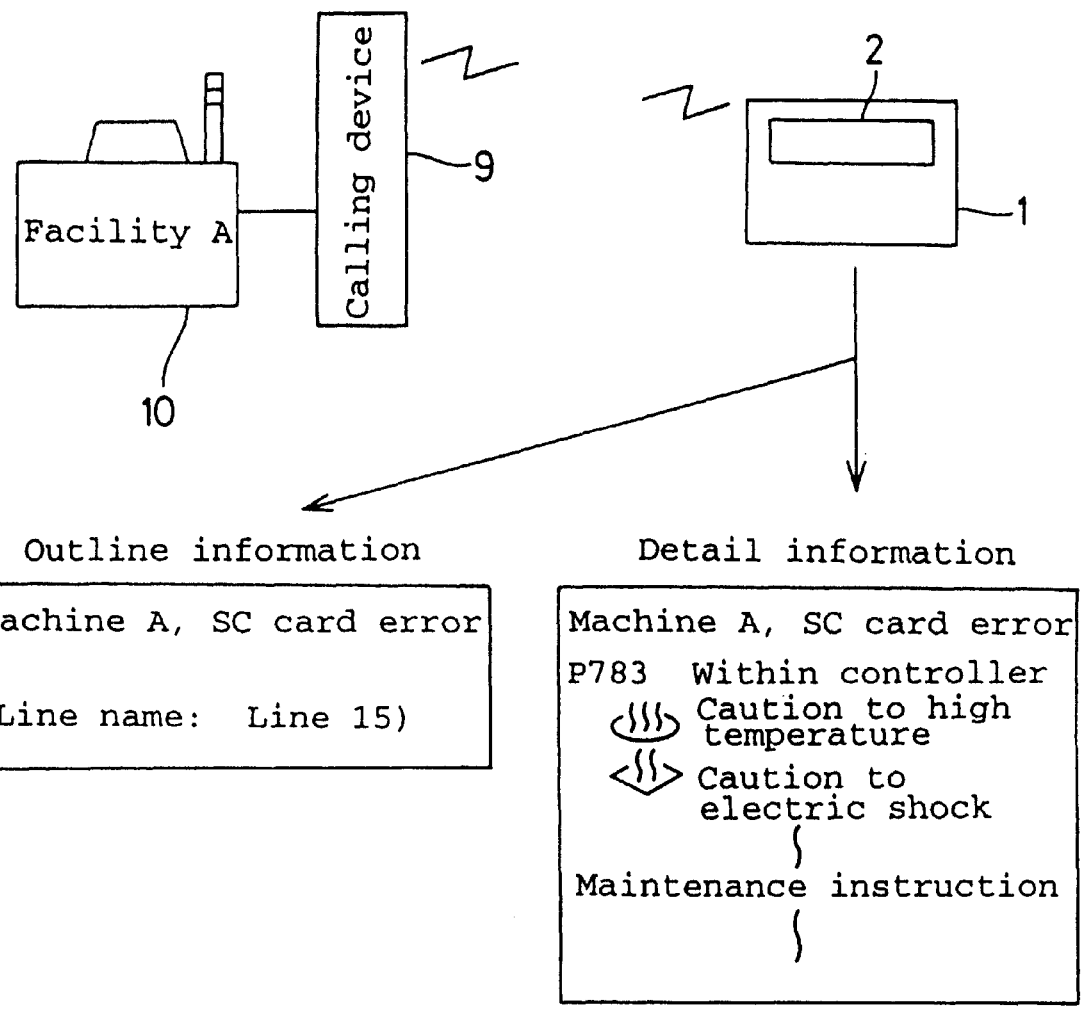
FIG. 7 is a diagram showing message transmission example 2 upon onset of an error of the same message sending system.

FIG. 7 is a diagram showing message transmission example 2 upon onset of an error of the message sending system of the invention. As shown in FIG. 7, when an error occurs in the facility 10, outline information (line name, facility name, error name, error number, and other outline information) and detail information (line name, facility name, error name, error number, maintenance instruction, warning, caution, and other detail information) are transmitted to the designated receiving terminal. The operator is informed when the error occurs as the outline information and detail information are transmitted from the facility 10 to the receiving terminal 1 through the calling device 9. At the receiving terminal 1, first, together with vibration or buzzer sound, characters of outline information shown in FIG. 1 are expressed. Later, by the manipulation of the operator, the outline information and detail information are changed over by the key 14 and displayed. As for the detail information in FIG. 6, it is a feature that a picture is displayed to show safety information in maintenance and error resetting operation (caution to high temperature, caution to electric shock) in the message display area 2.

Thus, according to these message sending systems, in the receiving terminal 1 possessed by the operator, the message is classified into outline message and detail message according to the information of risk rate or emergency of the information of various events occurring in the facility 10, the operator can determine whether or not to confirm all messages (outline message and detail message) depending on the circumstances, and if only the outline message is confirmed, the operator can confirm the detail message later in a free time.

Moreover, in the display unit of the receiving terminal 1, not only characters but also pictures can be also displayed depending on the received information, and the operator can intuitively understand the situation of the occurrence of the event in the mounting machine or facility 10 by pictures.

Figure 8:
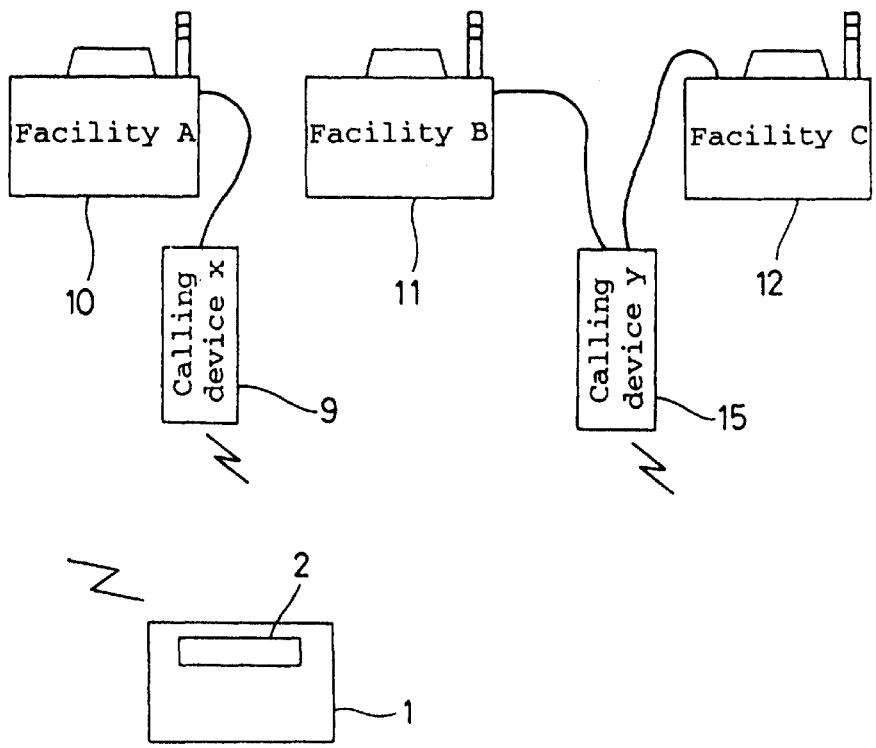
FIG. 8 is a diagram showing a constitution of a message sending system according to other embodiment of the invention.
Figure 9:
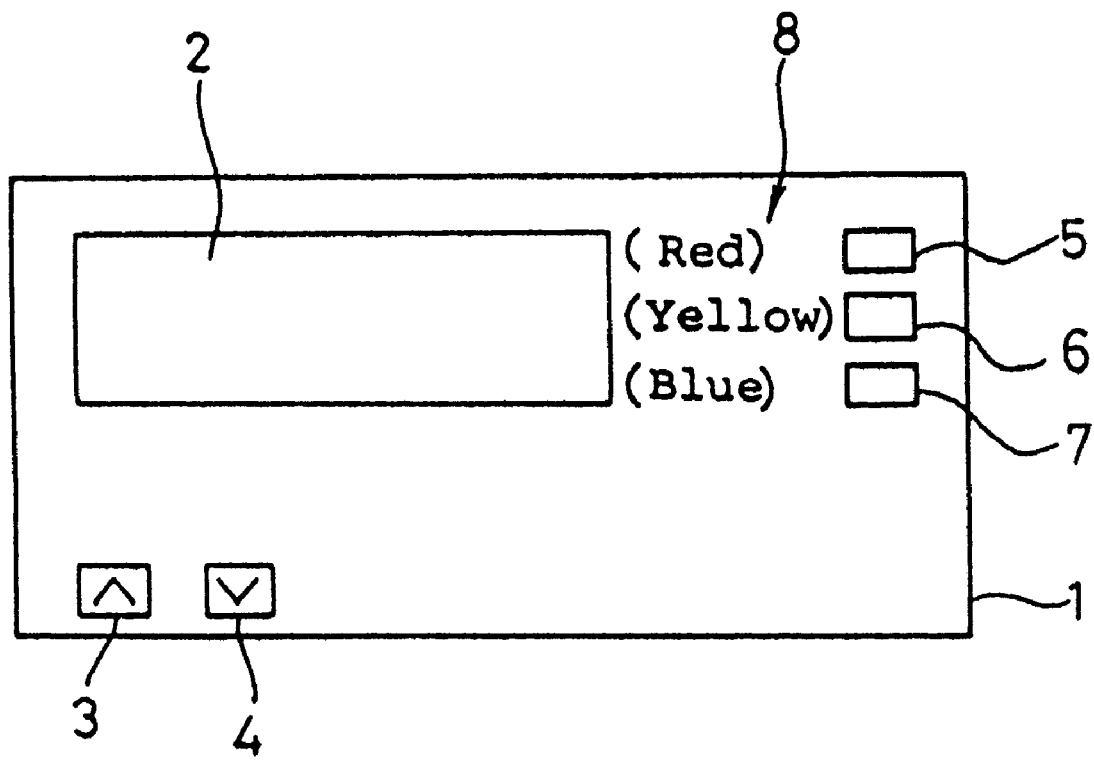
FIG. 9 is a front view showing a receiving terminal of a conventional message sending system.
Figure 11:
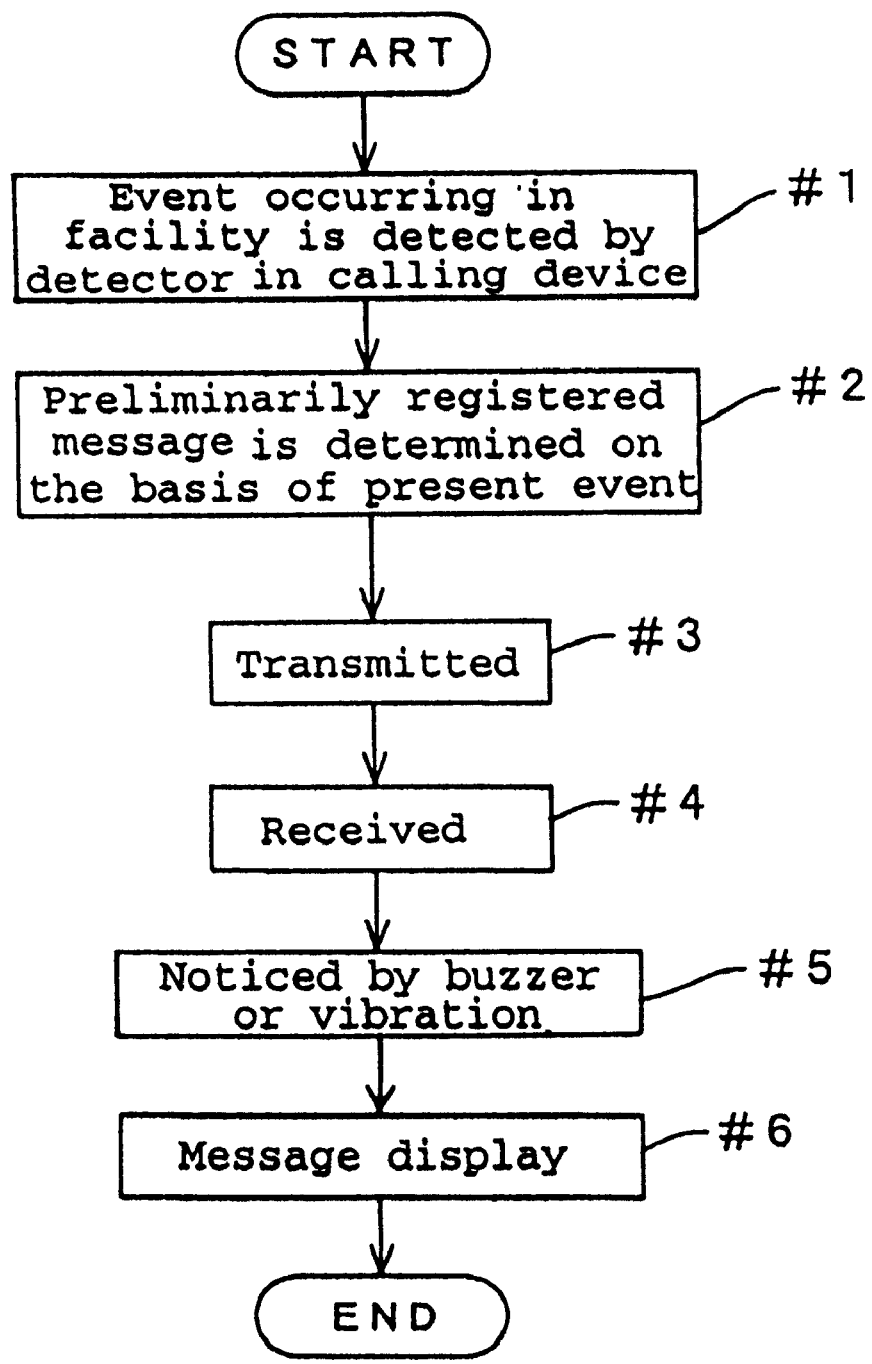
FIG. 11 is a flowchart showing control operation of the same conventional message sending system.
Figure 12:
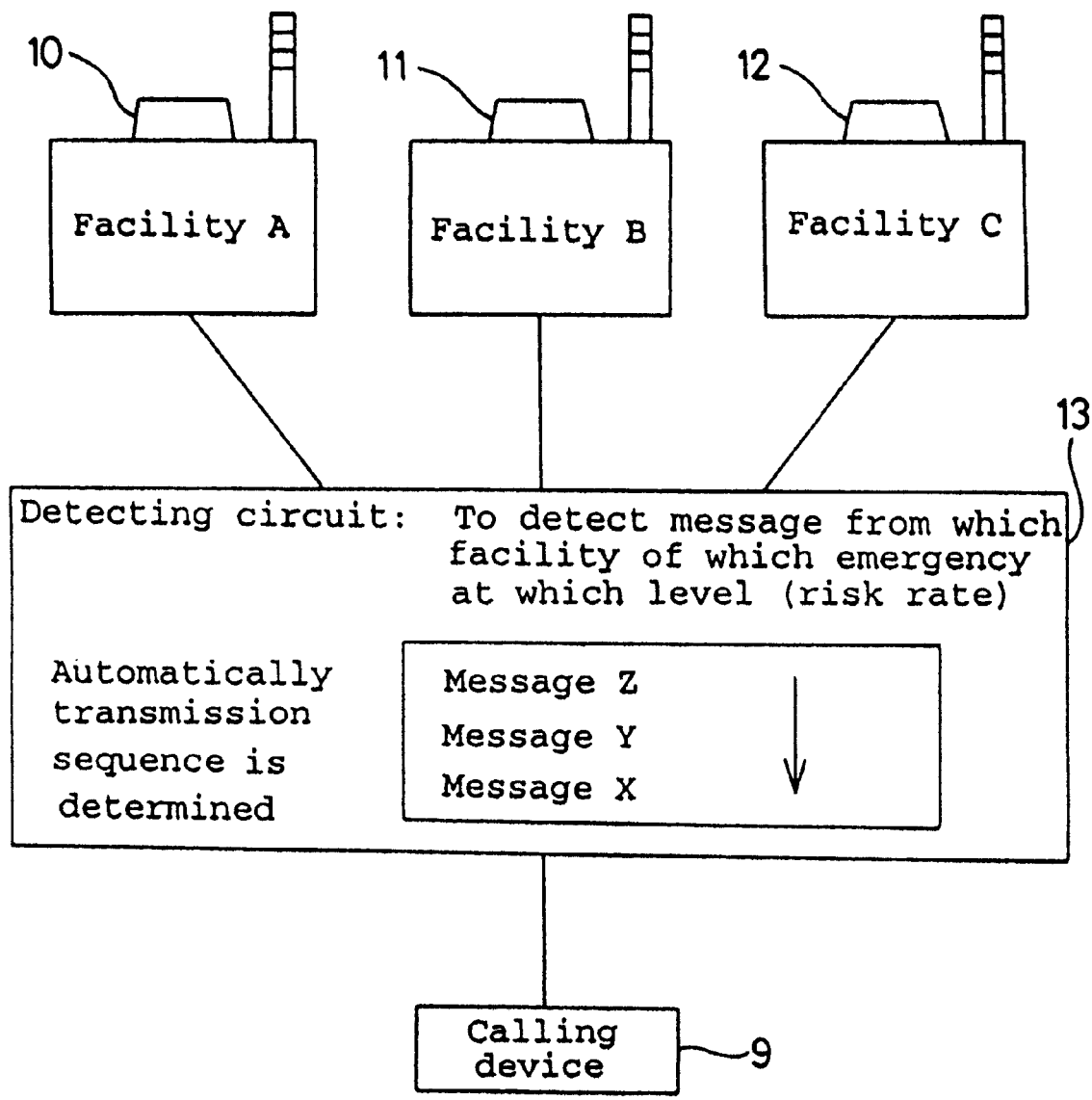
FIG. 12 is a diagram showing a configuration of an internal receiving terminal system of the same conventional message sending system.

FIG. 8 shows a message sending system in a different embodiment of the invention. In this message sending system, the receiving terminal 1 possessed by the operator is furnished with selecting means (not shown) for setting ID number such as terminal and mounting machine number by logic form to select which information to receive, out of plural calling devices 9 or plural pieces of information transmitted from one calling device 9.

In FIG. 8, example 1 shows a logic form in the case of receiving information of only the events taking place in the facility 10, example 2 shows a logic form in the case of receiving information of only the events taking place in the facility 10 or facility 11, example 3 shows a logic form in the case of receiving information of only the events taking place in the facility 11 or facility 12, and example 4 shows a logic form in the case of receiving information of only the events taking place in the facility 10 and facility 11 at the same time. Accordingly, the messages received in the receiving terminal 1 of the operator can be set by using the logic form of various ID numbers, and when the operator changes the desired information, it is not necessary to change the setting at the calling device 9.

In the foregoing explanations, the facilities 10, 11, 12 are mounting machines, but, needless to say, similar effects are expected in general processing or assembling facilities.

What is claimed is:

1. A message sending system comprising:

one or more detectors for detecting an event occurring in at least one of a plurality of facilities;

at least one transmitter provided to transmit information from one or more detectors, which transmits information about an event detected by said one or more detectors; and a receiving terminal usable by an operator of said at least one facility for receiving and displaying the event detected by the detector and transmitted by the transmitter, wherein the receiving terminal includes selecting means for selecting a specific facility, in which information is to be transmitted to a receiving terminal among a plurality of facilities or a specific transmitter to transmit information to the receiving terminal among a plurality of transmitters by an operator's manipulation.

2. A message sending system of claim 1, wherein an ID number assigned to a specific facility or transmitter can be selected by a logic form in the selecting means.

3. A message sending system of claim 1, wherein sound or vibration is generated in the receiving terminal when the information is received from the transmitter to inform the operator of the receiving terminal that information on an event has been received, and displayed, the display being at least one selected from the group consisting of alpha-numeric and pictorial displays.

4. A message sending system of claim 1, wherein the facility is a mounting machine for mounting parts on a printed board.

5. A message sending system of claim 1, wherein information from the transmitter is received by wireless means in the terminal.

* * * * *